W. J. BURNETT.
COOKER.
APPLICATION FILED FEB. 8, 1915.

1,161,838.

Patented Nov. 30, 1915.
2 SHEETS—SHEET 1.

Witnesses
H. D. Kilgore
E. C. Skinkle

Inventor
William J. Burnett
By his Attorneys
Williamson Merchant

W. J. BURNETT.
COOKER.
APPLICATION FILED FEB. 8, 1915.

1,161,838.

Patented Nov. 30, 1915.
2 SHEETS—SHEET 2.

Witnesses
H. D. Kilgore
E. C. Skinkle

Inventor
William J. Burnett
By his Attorneys
Williamson & Merchant

UNITED STATES PATENT OFFICE.

WILLIAM J. BURNETT, OF MINNEAPOLIS, MINNESOTA.

COOKER.

1,161,838.   Specification of Letters Patent.   Patented Nov. 30, 1915.

Application filed February 8, 1915. Serial No. 6,918.

*To all whom it may concern:*

Be it known that I, WILLIAM J. BURNETT, a citizen of the United States, residing at Minneapolis, in the county of Hennepin and State of Minnesota, have invented certain new and useful Improvements in Cookers; and I do hereby declare the following to be a full, clear, and exact description of the invention, such as will enable others skilled in the art to which it appertains to make and use the same.

My invention relates to improvements in cookers; and, to this end, it consists of the novel devices and combinations of devices hereinafter described and defined in the claims.

In the accompanying drawings, which illustrate the invention, like characters indicate like parts throughout the several views.

Figure 1:
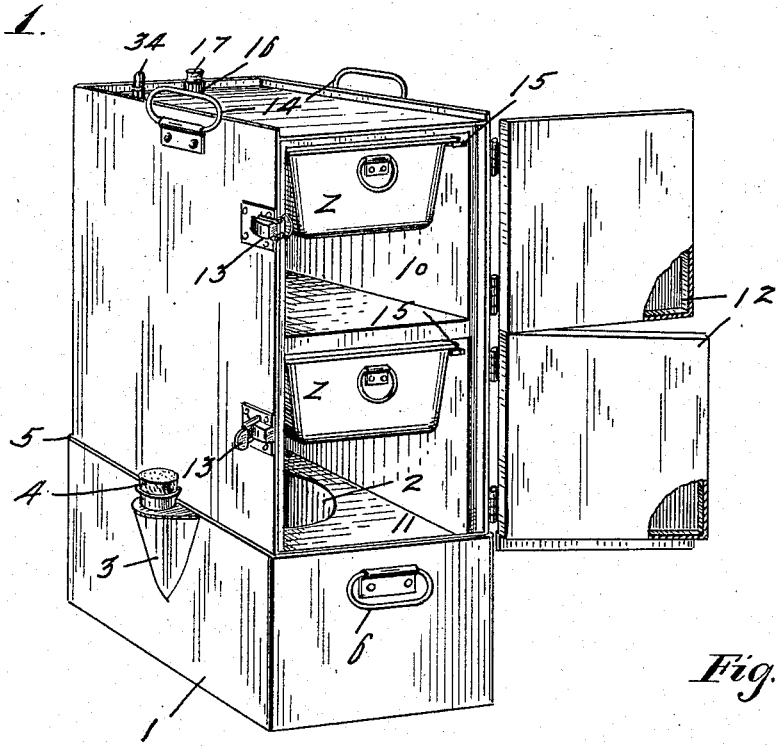
Figure 2:
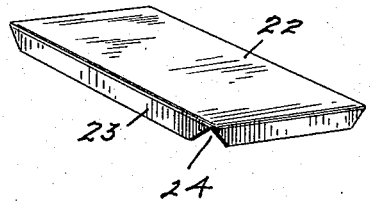
Figure 3:
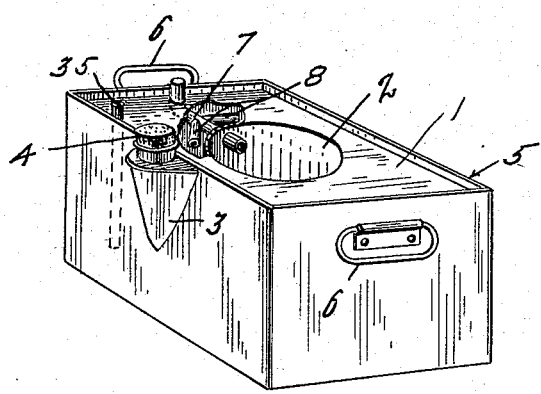
Figure 4:
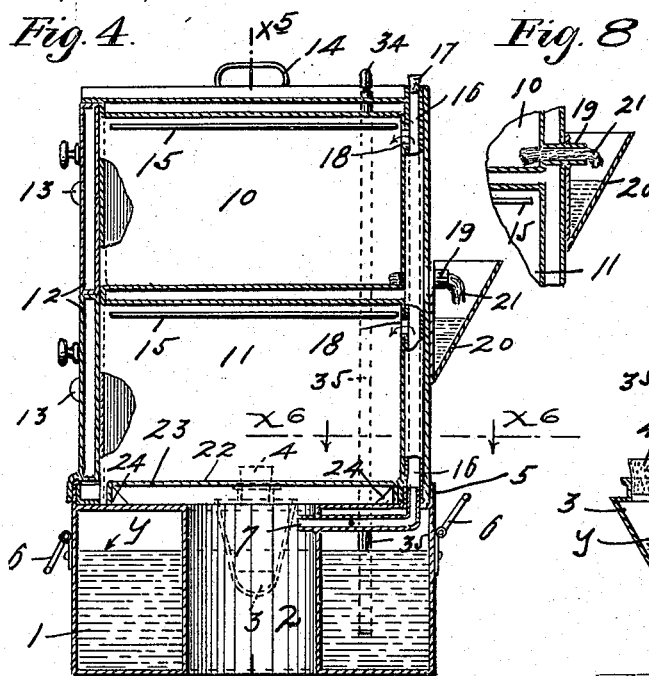
Figure 8:
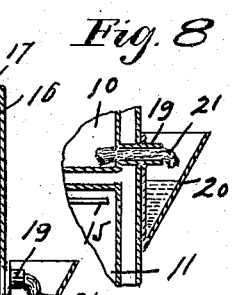
Figure 5:
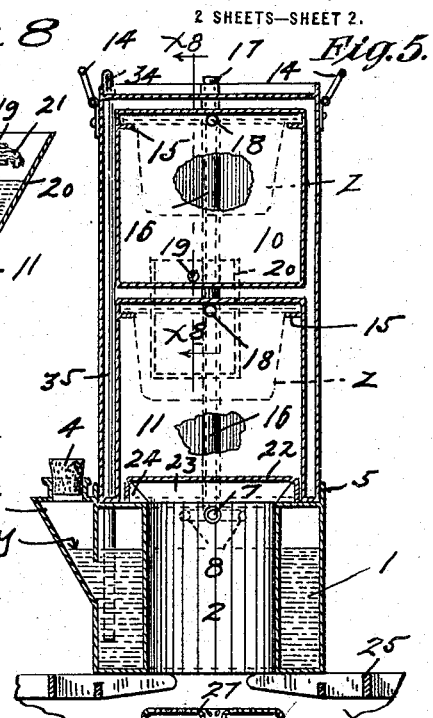
Figure 6:
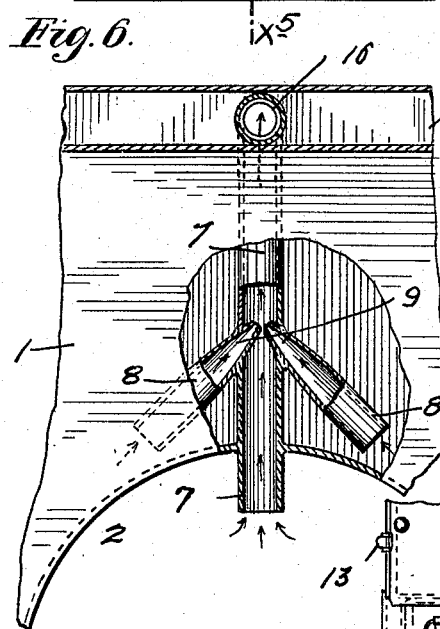
Figure 7:
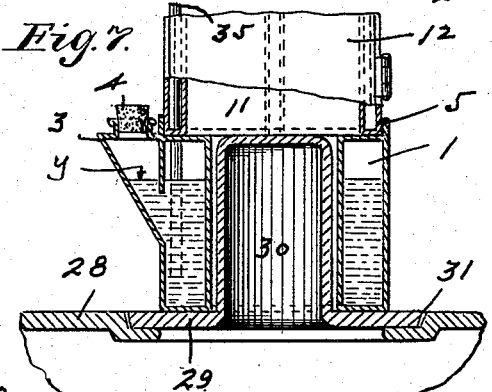
Figure 9:
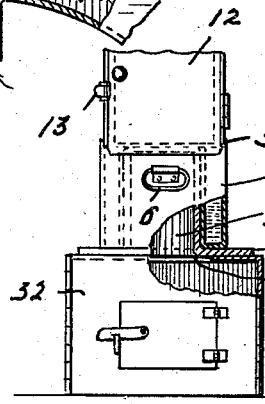

Referring to the drawings: Figure 1 is a perspective view of the improved cooker with the oven doors open, some parts being broken away; Fig. 2 is a perspective view of the so-called heat distributing plate; Fig. 3 is a perspective view of the steam boiler with the ovens removed, some parts being broken away; Fig. 4 is a vertical section taken longitudinally and centrally through the improved cooker; Fig. 5 is a vertical section taken on the line $X^5 X^5$ of Fig. 4, and also showing a portion of the burner and grill of a gas stove; Fig. 6 is a detail view principally in horizontal section taken on the line $X^6 X^6$ of Fig. 4, on an enlarged scale, some parts being broken away and some of the exposed parts being shown in horizontal section; Fig. 7 is a view corresponding to Fig. 5, with the exception that the improved cooker is in connection with a wood or coal stove; Fig. 8 is a detail view in section taken on the line $X^8 X^8$ of Fig. 5; and Fig. 9 shows the improved cooker as used in connection with a camp stove.

The numeral 1 indicates a rectangular steam boiler having a combustion flue or chamber 2 that extends vertically and centrally therethrough, and having an offset filling neck 3 normally closed by a cork 4. This steam boiler 1 is also provided with an upwardly projecting marginal flange 5, and hand pieces 6, by which said boiler may be carried. Extending horizontally within the steam boiler 1, just below the top thereof and above the water-line Y, is a hot air pipe 7, the receiving end of which extends into the combustion flue 2 and the delivery end thereof is bent into a vertical position and extended slightly above the top of the steam boiler 1. A pair of horizontally extended converging steam tubes 8 are located within the steam boiler 1. The delivery ends of these steam tubes 8 are contracted to afford discharge nozzles 9 which extend into the hot air pipe 7 at diametrically opposite points.

Removably mounted on top of the steam boiler 1, within the flanges 5 thereof, are upper and lower ovens 10 and 11, respectively. Each of these ovens is provided with a hinged door 12 normally held closed by a latch 13. Hand pieces 14 are secured to the sides of the oven 10, by which the ovens may be carried. The ovens are insulated by forming the same with double walls with dead air spaces therebetween. The doors 12, as well as the partition between the two ovens, are also formed with double walls with dead air spaces therebetween. The oven 11 has no bottom, but when the ovens and steam boiler are assembled, the top of said boiler affords a bottom for the lower oven. It will also be noted that the combustion flue 2 opens directly into the lower oven. The cooking utensils or pans Z may be placed directly on the bottoms of the ovens or supported thereabove on guide strips 15 secured to the inner walls of the ovens.

Located between the rear walls of the ovens is a vertical pipe 16, the lower end of which is telescoped over the delivery end of the pipe 7 and forms an extension thereof. The upper end of the pipe 16 is closed by cork 17, and ports or passageways 18 connect said pipe with the ovens 10 and 11 just under the tops thereof, and through which ports commingled steam and hot air from the boiler 1 and combustion flue 2 is delivered into said ovens.

A drip pipe 19 is provided for carrying away condensed steam which may accumulate on the bottom of the oven 10 and delivers the same into a drip cup 20 detachably secured to the back of the ovens. Within the drip pipe 19 is a wick 21 which prevents the escape of the steam. The condensed steam in the lower oven 11 is taken care of by the heat from the combustion flue 2.

Removably mounted within the lower oven 11 is a heat distributing plate 22 having downturned flanges 23 with openings 24 therein. If desired, this plate 22 may be inverted to cut off the direct passage of heat from the combustion flue 2 into the lower oven 11.

In Fig. 5, the improved cooker is shown supported on the grill 25 of a gas or vapor stove 26, and the numeral 27 indicates the burner thereof, directly over which is located the combustion flue 2. When the improved heater is used in connection with an ordinary wood or coal stove 28, as shown in Fig. 7, a special lid 29 having a dome 30 is placed over one of the stove holes 31. This dome 30 is telescoped into the combustion flue 2 and prevents the smoke and gases from passing up into the ovens.

In Fig. 9, the improved cooker is shown as used in connection with a folding camp stove 32. In this use of the cooker, the lid 29 will be supported on the top of the camp stove directly over the hole 33 formed in the top thereof.

As a warning to prevent the water from evaporating entirely from the boiler 1 and causing the same to become dry, a whistle 34 is provided, located on top of the oven 10. This whistle 34 is actuated by a steam pipe 35 which extends between the rear walls of the ovens into the boiler 1 and terminates slightly above the bottom thereof. Obviously, when the water in the boiler drops to a point below the lower end of the steam pipe 35, the steam in said boiler will then escape through said pipe and blow the whistle 34. The steam pipe 35 is made in two sections telescopically connected at the top of the boiler 1 to permit the removal of the ovens from the steam boiler.

The operation of the improved cooker may be briefly described as follows: The steam generated in the boiler 1 will escape through the steam tubes 8, nozzles 9 and into the pipe 7. Where the jets of steam meet within the hot air pipe 7, a partial vacuum will be caused, thereby drawing the hot air from the combustion flue 2 into said hot air pipe. The commingled steam and hot air from the junction of the nozzles 9 will be forced upward through the hot air pipes 7 and 16 and into the ovens 10 and 11. If it is desired to cook part of the food with dry heat instead of combined steam and hot air, the port 18 in the lower oven 11 may be closed by a cork or other suitable means, not shown, thereby cutting off the combined steam and hot air. By closing the receiving end of the hot air pipe 7 with a metal plug or other suitable means, not shown, and by closing the port 18 into the lower oven 11, by a cork, to cut off the supply of commingled steam and hot air thereto, food may be cooked in the lower oven entirely by hot air direct from the burner, and food may be cooked in the upper oven by steam alone.

What I claim is:

1. In a cooker, the combination with a steam boiler having a combustion chamber extending vertically therethrough, of upper and lower ovens supported on the boiler with the combustion chamber opening directly into the lower oven, a hot air pipe extending from the combustion chamber through the steam boiler through the two ovens and having ports opening one into each oven, and a steam nozzle located in the steam boiler extending directly into the hot air pipe at a point where the same passed through the steam boiler.

2. In a cooker, the combination with a steam boiler having a combustion chamber extending vertically therethrough, of upper and lower ovens supported on the boiler with the combustion chamber opening directly into the lower oven, a hot air pipe extending from the combustion chamber through the steam boiler through the two ovens and having ports opening one into each oven, and a pair of diametrically opposite steam nozzles located in the steam boiler and extending into the hot air pipe at points where the same passes through the steam boiler.

3. In a cooker, the combination with a steam boiler having a combustion flue extending therethrough, upper and lower ovens supported on said boiler, said combustion flue opening directly into said lower oven, steam and hot air conduits leading from said boiler, combustion flue arranged to commingle the steam and hot air and deliver the same into said ovens, and means for cutting off the discharge of commingled steam and hot air into said lower oven, at will.

4. In a cooker, the combination with a steam boiler having a combustion flue extending therethrough, upper and lower ovens supported on said boiler, said combustion flue opening directly into said lower oven, steam and hot air conduits leading from said boiler, combustion flue arranged to commingle the steam and hot air and deliver the same into said ovens, means for cutting off the discharge of commingled steam and hot air into said lower oven, at will, a drip pipe leading from said upper oven, a wick in said drip pipe, and a drip cup arranged to receive from said drip pipe.

5. In a cooker, the combination with a steam boiler having a combustion flue extending therethrough, of an oven supported on said boiler, said combustion flue opening directly into said oven, steam and hot air conduits leading from said boiler and combustion flue, arranged to commingle the steam and hot air and deliver the same into said oven, and a removable spreader plate in said oven overlying said combustion flue.

6. In a cooker, the combination with a steam boiler having a combustion flue extending therethrough, of an oven supported on said boiler, said combustion flue opening directly into said oven, steam and hot air conduits leading from said boiler and combustion flue, arranged to commingle the steam and hot air and deliver the same into said oven, and a reversible spreader plate in said oven adapted, when in one position, to close said combustion flue, and, when in another position, to spread the flame.

7. In a cooker, the combination with the lid for a stove hole having a dome, of a steam boiler, mounted on said lid, and having an upright combustion flue into which the dome of said lid is telescoped, an oven supported on said boiler, and conduits leading from said boiler and combustion flue, arranged to commingle the steam and hot air and deliver the same into said boiler.

In testimony whereof I affix my signature in presence of two witnesses.

WILLIAM J. BURNETT.

Witnesses:
F. CALDWELL,
HARRY D. KILGORE.

Copies of this patent may be obtained for five cents each, by addressing the "Commissioner of Patents, Washington, D. C."